(12) United States Patent
Xuan et al.

(10) Patent No.: US 7,499,026 B2
(45) Date of Patent: Mar. 3, 2009

(54) SYSTEM AND METHOD FOR INPUTTING GRAPHS AND WORDS

(76) Inventors: Yongnan Xuan, 904, Building 20 West District 2, South China University of Technology, Guangzhou City, Guangdong Province (CN) 510641; Suili Feng, 904, Building 20 West District 2, South China University of Technology, Guangzhou City, Guangdong Province (CN) 510641

( * ) Notice: Subject to any disclaimer, the term of this patent is extended or adjusted under 35 U.S.C. 154(b) by 670 days.

(21) Appl. No.: 10/836,097

(22) Filed: Apr. 29, 2004

(65) Prior Publication Data

US 2004/0252108 A1    Dec. 16, 2004

(51) Int. Cl.
    *G06F 3/033*    (2006.01)
(52) U.S. Cl. .................... 345/158; 345/173; 345/175; 345/179; 178/18.01; 178/19.01; 178/19.05
(58) Field of Classification Search ............... 345/173, 345/179, 180, 181, 182, 158, 175; 178/18.01, 178/19.01, 19.02, 19.03, 19.05
See application file for complete search history.

(56) References Cited

U.S. PATENT DOCUMENTS

| | | | | | |
|---|---|---|---|---|---|
| 6,111,565 | A | * | 8/2000 | Chery et al. | 345/179 |
| 6,133,906 | A | * | 10/2000 | Geaghan | 345/179 |
| 6,181,329 | B1 | * | 1/2001 | Stork et al. | 345/179 |
| 6,335,727 | B1 | * | 1/2002 | Morishita et al. | 345/179 |
| 2002/0180714 | A1 | * | 12/2002 | Duret | 345/179 |

* cited by examiner

*Primary Examiner*—My-Chau T Tran
(74) *Attorney, Agent, or Firm*—Thorpe North & Western LLP

(57) ABSTRACT

A system for transmitting graphic information from a writing area to a display device. The method can include the operation of transmitting a signal from a writing device. The signal can be received by a plurality of transceivers, each of the transceivers being placed a sufficient distance from the remaining plurality of transceivers that there is a calculable time difference of the wireless signal received between the plurality of transceivers to enable a determination of the writing device's location and movement. A further operation is displaying the writing device's location and movement on a display device such that the electronic medium shows substantially similar graphic information as compared to the writing area.

22 Claims, 3 Drawing Sheets

SYSTEM AND METHOD FOR INPUTTING GRAPHS AND WORDS

PRIORITY CLAIM

Priority from PCT/CN02/00782, designating the United States, and filed on Nov. 4, 2002 and published as WO 03/040905 on May 15, 2003 is claimed, which claims priority from Chinese application No.CN01140542.2 filed on Nov. 5, 2001.

FIELD OF THE INVENTION

The present invention relates generally to graphical data input devices. More specifically, the invention relates to systems for entering data via a handheld stylus or other writing device.

BACKGROUND

The ability to electronically input drawings and text can be an essential step in the employment of modern computer technology to process such data. Presently, there are many methods used to input drawings and text.

For example, text can be entered into a computer with a keyboard. Despite being the most common and mature form of text input, the keyboard has several shortcomings. When text from a non-Roman language is entered it can require a coding method to input non-alphabetic based text. This method is difficult to learn and awkward to use. When the keyboard is small, or the number of keys is limited, as in the case of PDAs and cell phones, the input process can be slowed considerably. Also, incorrect keys pressed lead to inaccurate text inputs. Finally, it is not feasible to use the keyboard to input drawings into a computer.

Another method for inputting data into a computer is to use a mouse. A mouse can be efficacious in drawing simple geometric shapes, such as a rectangle, circle, etc. However, using a mouse can be inefficient. Errors are easy to make when drawing complex curves and shapes. Also, it is inefficient and difficult to input text using a mouse. Though there are devices such as touch screens and tablets that attempt to incorporate graphic and text input into a machine, they have not been able to provide adequate solutions for several problems. Writing and drawing can be limited to often small, confined areas such as a screen. The use of a stylus requires a certain amount of pressure different from that normally applied when writing with a conventional pen. This can be an inconvenience to the user. Editing drawings and text can be tedious at best. It can be cumbersome to carry often bulky screens and tablets when using mobile devices, such as handsets, telephones, and PDAs.

SUMMARY OF THE INVENTION

The invention provides an apparatus and method for transmitting graphic information from a writing area to a display device. The method can include the operation of transmitting a signal from a writing device. The signal can be received by a plurality of transceivers, each of the transceivers being placed a sufficient distance from the remaining plurality of transceivers that there is a calculable time difference of the wireless signal received between the plurality of transceivers to enable a determination of the writing device's location and movement. A further operation is displaying the writing device's location and movement on a display device such that the electronic medium shows substantially similar graphic information as compared to the writing area.

DETAILED DESCRIPTION

Figure 1:
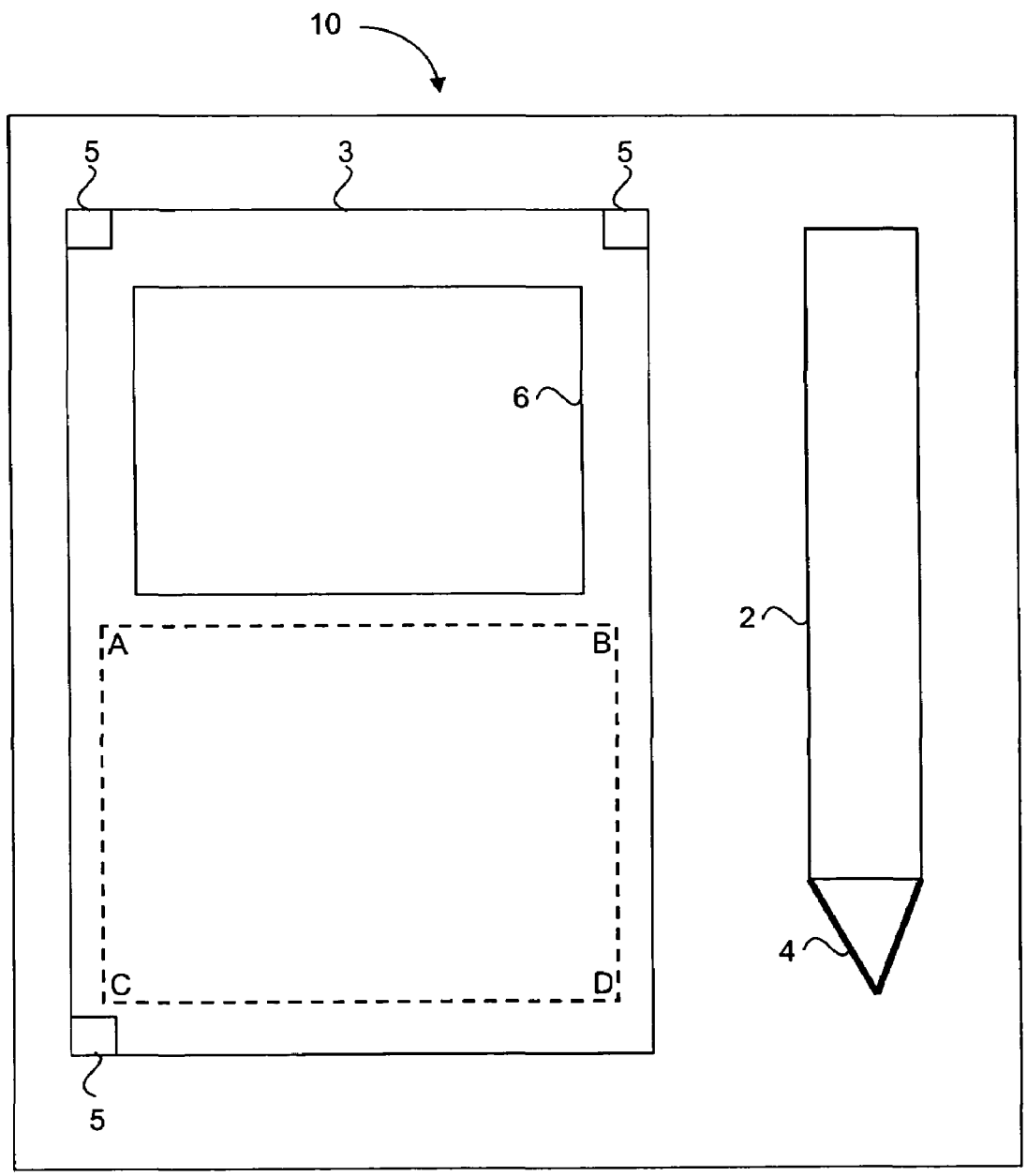
FIG. 1 illustrates a functional block diagram of one embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, an apparatus, indicated generally at 10, is shown comprising a writing device 2 with a built-in wireless signal generator 4 and a receiver/display device 3 containing a plurality of transducers 5 placed in a plurality of locations around a writing area defined by the points A, B, C, and D.

In one embodiment, the receive display/device can comprise a display screen 6 that can be located next to the writing area. When writing device 2 is in use, being used to either write or draw, a wireless signal generator 4 can emit a characteristic wireless signal, which varies as a function of time. The generator 4 can be located near the tip of the writing device 2.

The position of the writing tip on writing device 2 can be calculated by the receive/display device 3 by processors which determine the time difference at which the signal emitted by the writing device is received by each of the transducers 5. The moving trajectory of writing device 2 can thus be calculated. The data can then be saved, processed, and displayed to represent the writings and drawings of the writing device 2.

In another embodiment, the transducers can be transceivers, which can receive the signal transmitted by the writing device and transmit the data received to a receiver. The receiver can be connected to an electronic display device or a computer, as will be discussed in more detail below. The term transducer and transceiver can be used interchangeably throughout the document.

Three-dimensional drawings can be produced by the addition of another transducer 5 to the receive/display device 3, which can be placed appropriately to receive signals from the writing device as it is moved in 3-dimensional space. The three dimensional drawings can be used in various applications such as defining the movement of robots and in the manufacturing of three-dimensional parts. By processing the data received by the receive/display device 3, the position of writing device 2 can be displayed in the receive/display device 3 with markers. Thus, the relative location of the writing device can be shown on the display.

In another embodiment, the receiver can be separate from the display device. For example, a receiver may be configured such that it can be connected to a computer, enabling the computer to process, display, and store the movements of the writing device 2. The receiver can be connected to a PDA, laptop computer, desktop computer, tablet PC, or other computing device.

Writing device 2 may also function as a conventional pen, allowing hardcopies of drawings/text to be produced simultaneously with softcopies stored in PCs, handsets, PDAs etc.

Figure 2:
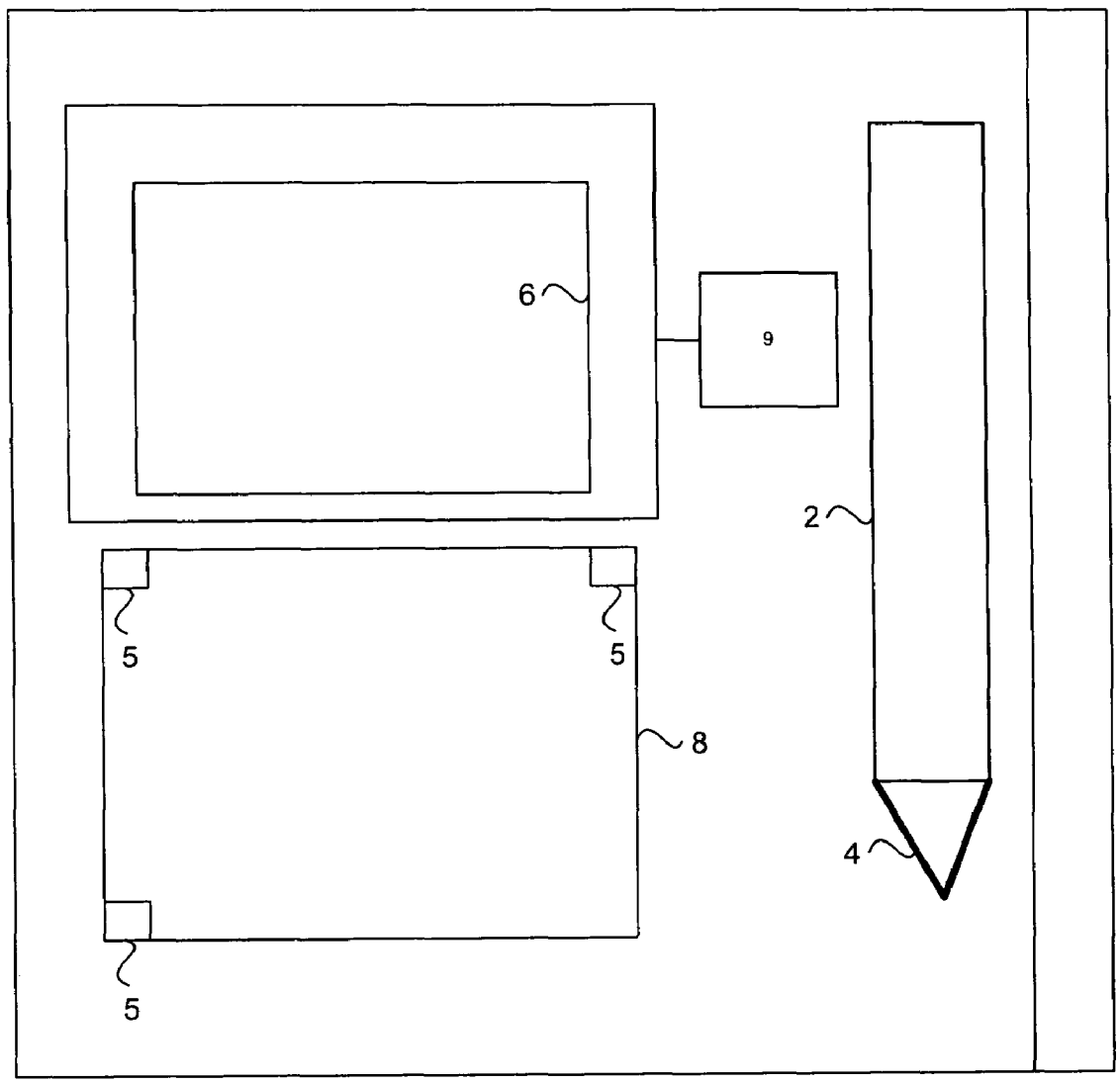
FIG. 2 illustrates a functional block diagram showing another embodiment of the present invention.

For convenience of use, the locations of the transducers 5 can be relocated, as shown in FIG. 2, adding flexibility to the methodology and apparatus of the present invention. For example, a plurality of the transducers 5 can be placed on a piece of paper 8. Writing device 2 can then write on the paper 8 with the movement of the writing device transmitted by the transducers 5 to a receiving device 9. The receiving device 9 can be connected to a display device 6.

In another embodiment, the writing device 2 can be configured to transmit to a personal area network (PAN) as taught in 802.15. This would enable the movements of the writing device 2 to be transmitted to the PAN, wherein the signal generator 4 transmits using Bluetooth, ultra-wideband, ZigBee, or other PAN standards described under IEEE 802.15, to a distant electronic device connected to the network. The personal area network can be connected to a local area network, a wide area network, or the Internet, allowing the movement of the pen to be transmitted virtually anywhere to an electronic device connected to the Internet.

Multiple writing devices 2 can take part in the generation of the texts/drawings from the same or in different working areas, including at different locations via the networks. Each of the writing devices 2 can be given a specific code. The specific code can be used to identify the user. The code may also be used to represent features of the drawings/text, such as fonts, colors, etc. Thus, a specific writing device containing a predetermined code can be used to specify a certain color, font, text, or drawing feature.

Handwriting can be processed and displayed as graphic input to preserve the originality of the document. This application would be useful in cases such as document signing or letter writing. An alternative would be to display handwriting as typewritten text. In this case the user's writing can be recognized and translated into standard typewritten text, which can then be displayed.

The ratio between the size of the writing/drawings and that of the screen of receive/display device 3 can be adjusted, in order to have optimal viewing.

Moreover, writing device 2 can perform such editing functions as delete, copy, paste, flip, search, replace, zoom, change pages etc. on documents by selection of settings on writing device 2 or receive/display device 3 or the movement of writing device 2 in a distinct manner. For example, moving up then quickly down may mean deleting, while left then right may mean copying.

Figure 3:
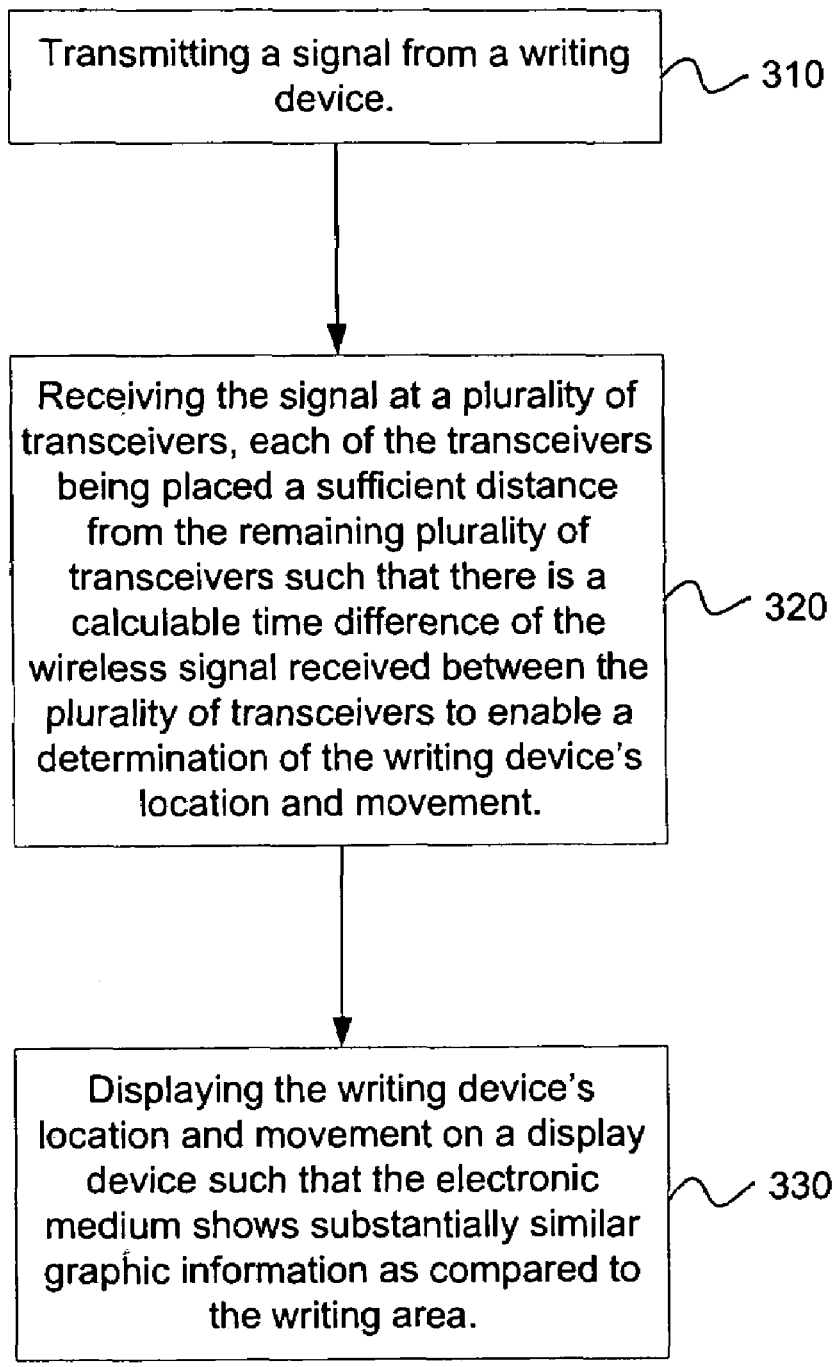
FIG. 3 is a flow chart depicting a method for transmitting graphic information from a writing area to a display device in an embodiment of the present invention.

Another embodiment of the present invention provides a method for transmitting graphic information from a writing area to a display device as depicted in the flow chart of FIG. 3. The method includes the operation of transmitting a signal from a writing device in block 310. A further operation involves receiving the signal at a plurality of transceivers, each of the transceivers being placed a sufficient distance from the remaining plurality of transceivers such that there is a calculable time difference of the wireless signal received between the plurality of transceivers to enable a determination of the writing device's location and movement in block 320. The time difference can be processed and used to display the movement of the writing device. Another operation involves displaying the writing device's location and movement on a display device such that the electronic medium shows substantially similar graphic information as compared to the writing area in block 330.

The benefits of using this invention over present methods of drawing/text input include:

1. Writing and drawing can be done using a writing device 2 as a pen, instead of an awkward stylus. Writing with a conventional pen proves to be easier (no special training required), faster, and less error-prone than using other devices. This can especially be true in the cases of using keyboards with small or reduced number of keys and space-limiting tablets.

2. Since the locations of the transducers 5 can be varied, the choice of the area for drawings/text input can be highly flexible. For example, the transducers 5 can be placed on a piece of paper. The area of the paper within the transducers 5 can then be written on with the writing device 2. The writings/drawings can then be inputted to a computer. This flexibility is unequaled among present devices, which dictate that the user operate on keyboards, designated screens or tablets.

3. Texts and drawings can be produced and edited in a similar fashion, including three-dimensional drawings.

4. A special code can be assigned to writing device 2 so that the user can be identified. A user ID can be used for E-commerce and security verification purposes. The codes can also be used to set preferences such as text color or font.

5. Multiple users can work on the same file, via a network, where appropriate.

6. Writing device 2 can also function as a conventional pen so that hardcopies can be made while generating softcopies of electronic files containing the drawing/text.

7. Text can be treated as graphics to maintain originality of the user's handwriting, or be translated into typewritten standard text through the use of handwriting recognition software.

8. The hardware of the apparatus is simple, inexpensive to manufacture and small in size.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. An apparatus for entering graphic information into an electronic medium, comprising:

a writing device comprising a wireless signal generator, wherein the signal generator is configured to emit a characteristic wireless signal and wherein the writing device is further configured to transmit an identification code identifying one of a plurality of writing device features of the writing device;

a display device carrying a plurality of transceivers configured to receive the characteristic wireless signal and the identification code in real time, wherein the plurality of transceivers are spaced a sufficient distance from each other such that the there is a calculable time difference in the characteristic wireless signal received by the plurality of receivers, said plurality of transceivers further configured to transmit each time difference to a display device; and the display device further configured to calculate a position of the writing device and a trajectory of the writing device as the writing device is moved in order to electronically display the relative location and trajectory of the writing device on the display device in real time based on the writing device feature identified through the identification code, wherein the writing device can operate in an area detached from the display device.

2. The apparatus of claim 1, wherein the plurality of transceivers are transponders configured to receive and transmit at least one ultrasonic frequency.

3. The apparatus of claim 1, wherein the characteristic wireless signal is selected from the group consisting of radio frequency, ultrasonic, and infrared.

4. The apparatus of claim 1, wherein the writing device is configured to operate as a conventional pen, enabling hardcopies of drawings and texts to be produced substantially simultaneously with the electronic display on the display device.

5. The apparatus of claim 1, further comprising a plurality of writing devices, wherein the plurality of writing devices are each configured to transmit the identification code.

6. The apparatus of claim 5, wherein the identification code is configured to represent one or more specific users.

7. The apparatus of claim 5, wherein the identification code is configured to distinguish between the writing device features of text input and graphic input.

8. The apparatus of claim 1, wherein the identification code is configured to specify the plurality of writing device features selected from the group consisting of color, text size, bold, underline, italic, line type and line width.

9. The apparatus of claim 1, wherein the characteristic wireless signal emitted from the writing device is encrypted.

10. The apparatus of claim 1, further comprising a pointer on the display device configured to show a relative position of the writing device on the display device.

11. The apparatus of claim 1, further comprising the display device configured to recognize a plurality of specific movements of the writing device that correspond to specific functions to be performed on the display device.

12. The apparatus of claim 11, wherein the specific functions to be performed are selected from the group consisting of opening a file, editing a file, saving a file, copying a file, moving a file, pasting a file, printing a file, and formatting a document.

13. The apparatus of claim 1, wherein the writing device can operate in an area coincident to the display device.

14. The apparatus of claim 1, further comprising a plurality of writing devices configured to be used at a plurality of locations to produce graphical information on the display device.

15. The apparatus of claim 1, wherein the display device is a display on a device selected from the group consisting of a desktop computer, a laptop computer, a tablet computer, a personal digital assistant, and a handheld computer.

16. The apparatus of claim 1, wherein the display device is configured to recognize hand written text and display type formatted text in the display device that corresponds to the handwritten text.

17. The apparatus of claim 1, wherein the display device is further configured to enable three dimensional movements of the writing device to be displayed.

18. The apparatus of claim 17, wherein the three dimensional movements can be recorded by the display device to represent three dimensional drawings.

19. The apparatus of claim 1, wherein the plurality of transceivers' location is adjustable by a user.

20. An apparatus for displaying graphic information entered using a writing device, comprising:
    a writing device comprising a transmitter configured to emit a wireless characterized signal and wherein the writing device is further configured to transmit an identification code identifying one of a plurality of writing device features of the writing device;
    a plurality of transceivers configured to receive the wireless characterized signal and transmit the signal to a receiver in real time, wherein each of the plurality of transceivers is spaced a sufficient distance from the remaining plurality of receivers such that there is a calculable time difference of the wireless characterized signal received between the transceivers to enable a determination of the writing device's location; and
    a display operably connected to the receiver and configured to calculate a relative position of the writing device from the time difference received by each of the plurality of transceivers, enabling the display to show in real time a relative position and movement of the writing device, wherein the display device is further configured to receive the identification code and display at least one of text and graphics in real time based on the writing device feature identified via the identification code, wherein the writing device can operate in an area detached from the display device.

21. A method for transmitting graphic information from a writing area to a display device, comprising the steps of:
    transmitting a signal and an identification code from a writing device, wherein the identification code identifies one of a plurality of writing device features of the writing device;
    receiving the signal at a plurality of transceivers in real time, each of the transceivers being placed a sufficient distance from the remaining plurality of transceivers such that there is a calculable time difference of the wireless signal received between the plurality of transceivers to enable a determination of the writing device's location and movement;
    displaying the writing device's location and movement on a display device in real time based on the writing device feature such that the electronic medium shows substantially similar graphic information as compared to the writing area, wherein the writing device can operate in an area detached from the display device.

22. An apparatus for entering graphic information into an electronic medium, comprising:
    a writing device comprising a wireless signal generator, wherein the signal generator is configured to emit a characteristic wireless signal and wherein the writing device is further configured to transmit an identification code identifying one of a plurality of writing device features of the writing device;
    a display device carrying a plurality of transceivers configured to receive the characteristic wireless signal and the identification code in real time, wherein the plurality of transceivers are spaced a sufficient distance from each other such that the there is a calculable time difference in the characteristic wireless signal received by the plurality of receivers, said plurality of transceivers further configured to transmit each time difference to a display device; and
    the display device further configured to calculate a position of the writing device and a trajectory of the writing device as the writing device is moved in order to electronically display the relative location and trajectory of the writing device on the display device in real time based on the writing device feature identified through the identification code, wherein three dimensional movements of the writing device can be recorded by the display device to represent three dimensional drawings.

* * * * *